United States Patent

Nakamoto et al.

(10) Patent No.: US 11,515,597 B2
(45) Date of Patent: Nov. 29, 2022

(54) BATTERY PACK

(71) Applicant: Nissan Motor Co., Ltd., Yokohama (JP)

(72) Inventors: Masahiro Nakamoto, Kanagawa (JP); Gen Takayama, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 650 days.

(21) Appl. No.: 15/764,342

(22) PCT Filed: Oct. 22, 2015

(86) PCT No.: PCT/JP2015/079904
§ 371 (c)(1),
(2) Date: Mar. 29, 2018

(87) PCT Pub. No.: WO2017/068709
PCT Pub. Date: Apr. 27, 2017

(65) Prior Publication Data
US 2018/0287109 A1   Oct. 4, 2018

(51) Int. Cl.
*H01M 50/20* (2021.01)
*H01M 50/502* (2021.01)
(Continued)

(52) U.S. Cl.
CPC ........ *H01M 50/20* (2021.01); *H01M 10/0525* (2013.01); *H01M 10/482* (2013.01);
(Continued)

(58) Field of Classification Search
CPC ...... H01M 2/1016; H01M 2/26; H01M 2/202; H01M 10/0525; H01M 10/482
See application file for complete search history.

(56) References Cited

U.S. PATENT DOCUMENTS 9,865,849 B2    1/2018  Kayano et al.
2007/0281208 A1  12/2007 Yoon et al.
(Continued)

FOREIGN PATENT DOCUMENTS

CN    101911336 A   12/2010
CN    102473879 A    5/2012
(Continued)

*Primary Examiner* — Brian R Ohara
(74) *Attorney, Agent, or Firm* — Global IP Counselors, LLP (57) ABSTRACT

A battery pack includes a plurality of stacked battery assemblies and an insulating spacer. The battery assemblies are provided with a pair of unit cells stacked in a thickness direction. Each unit cell includes a cell body having a power generation element and a flat shape, and an electrode tab protruding out from the cell body. The spacer is disposed between electrode tabs of the pair of the unit cells holding the electrode tabs and is electrically connected in the battery assemblies. A pair of the electrode tabs has distal end portions electrically connecting adjacent battery assemblies of the battery assemblies to each other. The distal end portions are bent in the stacking direction on a side of a surface of the insulating spacer. The distal end portions are positioned on opposite sides of the cell body. The distal end portions that are bent are electrically connected to each other.

9 Claims, 8 Drawing Sheets (51) Int. Cl.
  *H01M 50/531* (2021.01)
  *H01M 50/409* (2021.01)
  *H01M 10/0525* (2010.01)
  *H01M 10/48* (2006.01)
  *H01M 50/209* (2021.01)
(52) U.S. Cl.
  CPC ....... *H01M 50/409* (2021.01); *H01M 50/502* (2021.01); *H01M 50/531* (2021.01); *H01M 50/209* (2021.01)

(56) References Cited

U.S. PATENT DOCUMENTS

| | | | | |
|---|---|---|---|---|
| 2008/0124617 | A1* | 5/2008 | Bjork | H01M 6/40 |
| | | | | 429/90 |
| 2009/0257164 | A1* | 10/2009 | Ikeuchi | G01K 7/01 |
| | | | | 361/91.5 |
| 2010/0310909 | A1 | 12/2010 | Yun et al. | |
| 2015/0037662 | A1* | 2/2015 | Pinon | H01M 50/10 |
| | | | | 429/179 |
| 2015/0380697 | A1* | 12/2015 | Osborne | H01M 50/502 |
| | | | | 429/91 |
| 2016/0072116 | A1 | 3/2016 | Yanagihara et al. | |
| 2016/0254522 | A1* | 9/2016 | Johler | H01M 2/204 |
| | | | | 429/61 |

FOREIGN PATENT DOCUMENTS

| | | |
|---|---|---|
| JP | 2010-218755 A | 9/2010 |
| JP | 2012-195123 A | 10/2012 |
| JP | 2013-191538 A | 9/2013 |
| JP | 2013-536979 A | 9/2013 |
| JP | 2013-229266 A | 11/2013 |
| JP | 2014-110219 A | 6/2014 |
| JP | 2014-135163 A | 7/2014 |
| KR | 10-2011-0087744 A | 8/2011 |
| KR | 10-2012-0048631 A | 5/2012 |
| WO | 2014/073443 A1 | 5/2014 |
| WO | 2014/109101 A1 | 7/2014 |
| WO | 2014/147809 A1 | 9/2014 |

* cited by examiner

BATTERY PACK

CROSS-REFERENCE TO RELATED APPLICATIONS

This application is a U.S. National stage application of International Application No. PCT/JP2015/079904, filed on Oct. 22, 2015.

BACKGROUND

Field of the Invention

The present invention relates to a battery pack.

Background Information

In recent years, in the automobile industry, development of secondary batteries and fuel cells have been widely carried out, from the point of view of environmental protection and fuel economy. Since the output of each battery in a secondary battery is not very high, a desired number thereof are stacked to form a battery pack, in order to enable cruising speed in an automobile. As a conventional technique relating to battery packs, Japanese Laid Open Patent Application No. 2010-218755 (hereinafter referred to as Patent Document 1) discloses a technique in which a spacer is disposed at the ends of a secondary battery in plain view, such that unit cells constituting the battery pack will not move inside the case of the battery pack.

SUMMARY

Since a spacer is often disposed in accordance with the shape of the unit cell in the vicinity of an electrode tab that protrudes from the unit cell in the planar direction, the spacer tends to have a flat shape. In addition, in the field of stacking a plurality of unit cells such as a battery pack, thinning and miniaturizing batteries for the purpose of reducing the volume of the battery pack are being studied. However, for example, when attempting to reduce the thickness of unit cells for the purpose of thinning, since the spacer is disposed in accordance with the shape of the unit cells, the thickness of the spacer is also reduced. Spacers are often formed from resin materials, and if the thickness thereof is reduced, the thickness direction dimension becomes smaller than the planar direction dimension, and there could be concerns about points such as the moldability and the strength of the spacer.

An object of the present invention is to provide a battery pack that achieves a thin and compact size.

A battery pack according to the present invention that achieves the object described above is formed by stacking a plurality of battery assemblies that are each provided with at least a pair of unit cells that are stacked in the thickness direction and that have a cell body, which includes a power generation element and is formed into a flat shape, and an electrode tab protruding out from the cell body, with an insulating spacer disposed between the electrode tabs of the pair of stacked unit cells. In the present invention, the spacer holds the electrode tabs of the pair of unit cells, the pair of held unit cells are electrically connected to each other in the battery assembly, the distal end portions of a pair of electrode tabs that electrically connect the adjacent battery assemblies to each other are bent in the stacking direction of the battery assemblies, on a side of a surface, from among the surfaces of the spacer positioned on the opposite side of the cell body, and the bent portions are electrically connected to each other.

DETAILED DESCRIPTION OF EMBODIMENTS

Embodiments according to the present invention will be described below, with reference to the appended drawings. In the explanations of the drawings, the same elements are given the same reference symbols, and overlapping explanations are omitted. The sizes and ratios of the members in the drawing are exaggerated for convenience of explanation and may be different from the actual sizes and ratios.

Figure 1:
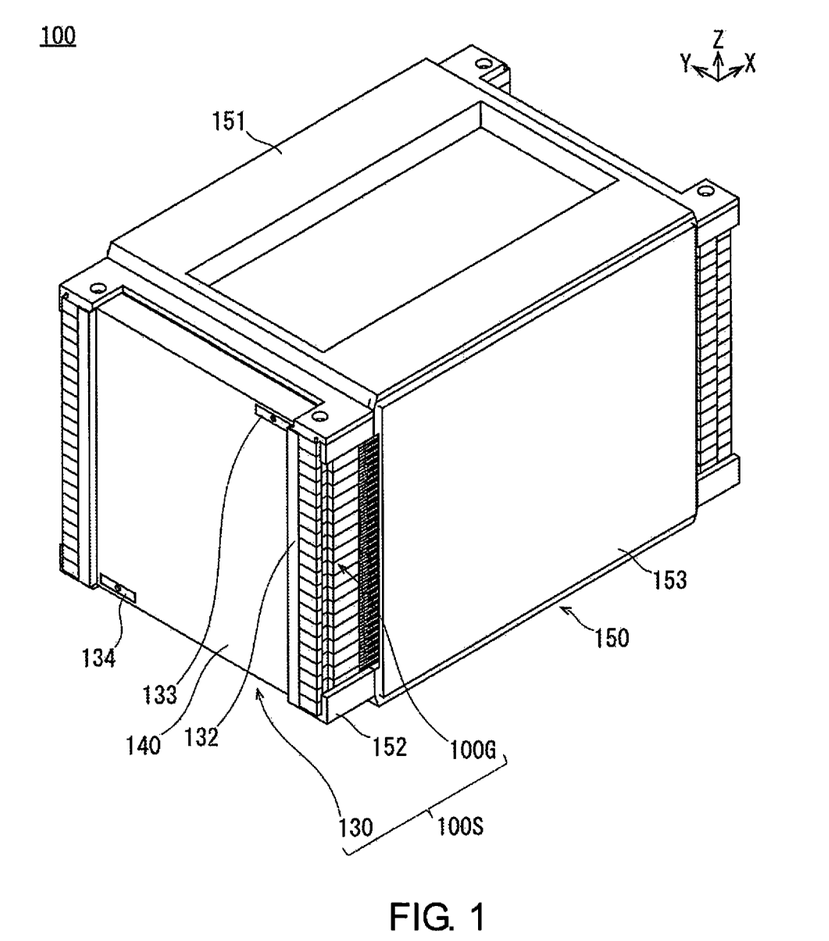
FIG. 1 is a perspective view illustrating a battery pack according to the first embodiment of the present invention.
Figure 2A:
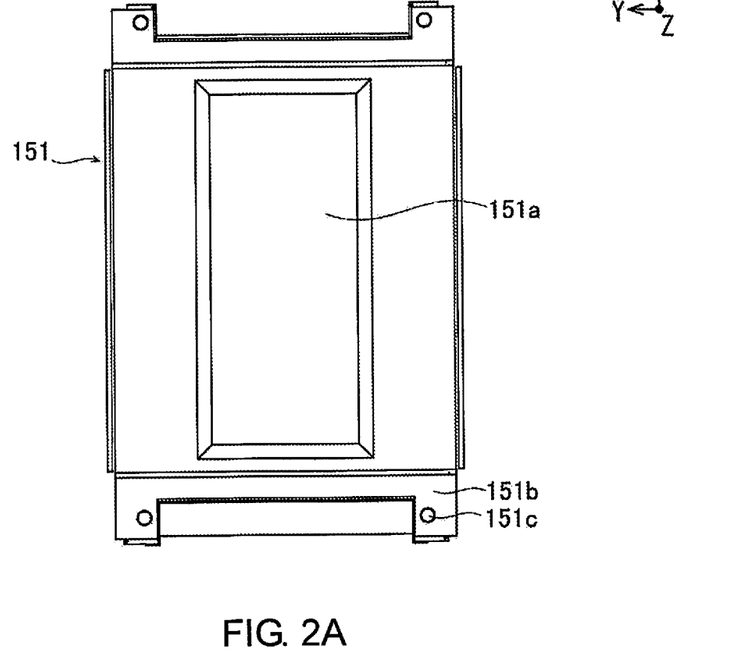
FIG. 2A and FIG. 2B are a plan view and a side view illustrating the battery pack shown in FIG. 1.
Figure 2B:
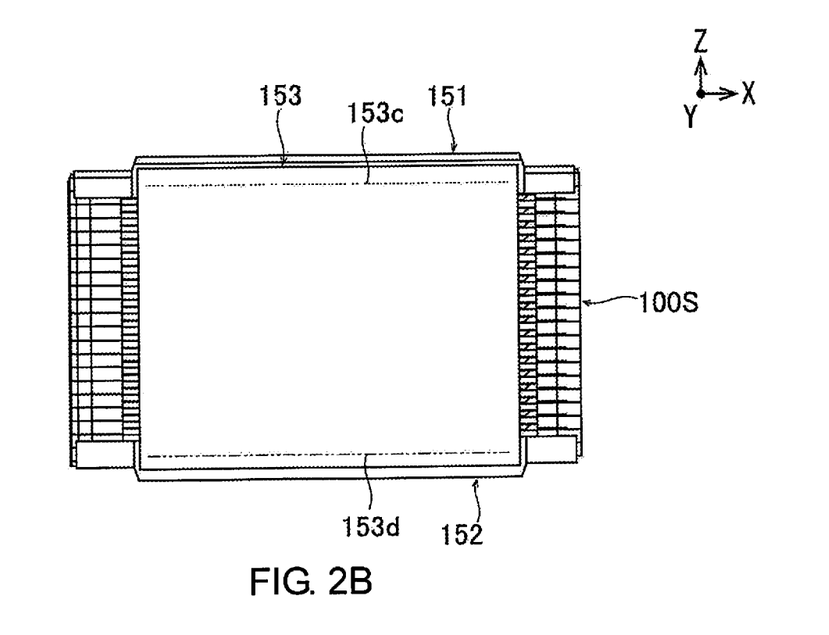
Figure 3:
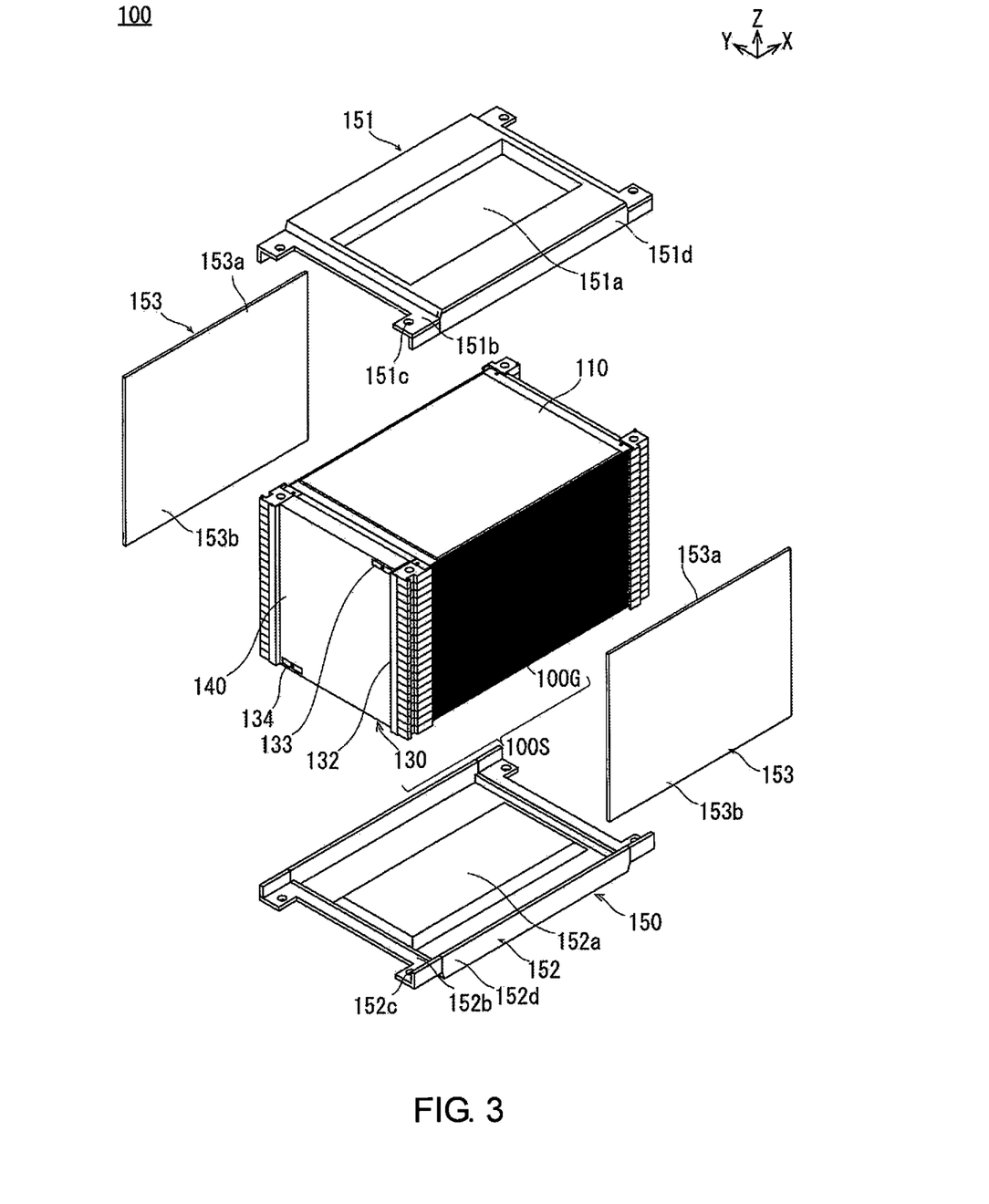
FIG. 3 is an exploded perspective view illustrating the battery pack in an exploded state.
Figure 4:
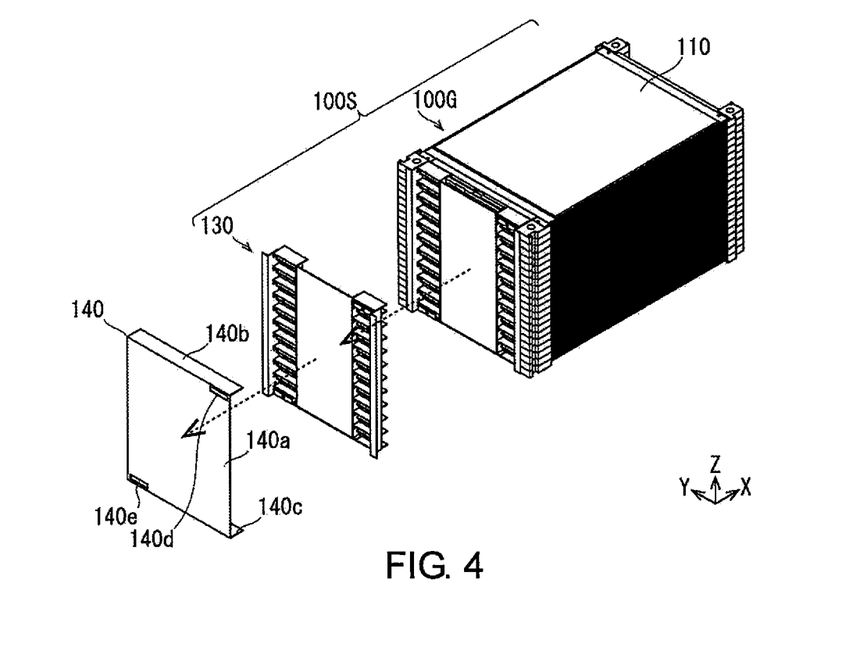
FIG. 4 is a perspective view illustrating a state in which the protective cover is detached from the stacked body illustrated in FIG. 3, and the stacked body is disassembled into a cell group and a bus bar unit.
Figure 5:
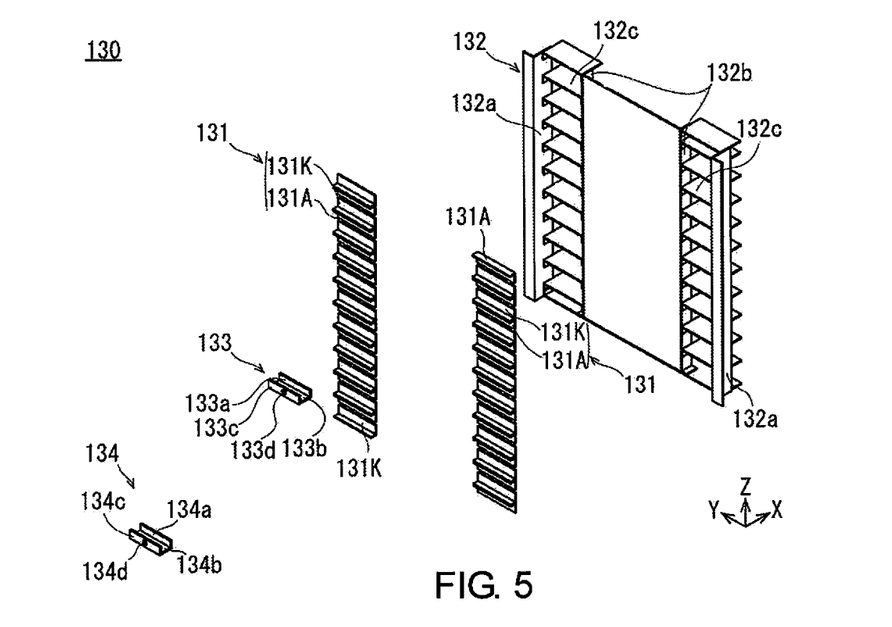
FIG. 5 is an exploded perspective view illustrating the bus bar unit illustrated in FIG. 4.

FIG. 1 is a perspective view illustrating the battery pack according to one embodiment of the present invention. FIG. 2A and FIG. 2B are a plan view and a side view illustrating the battery pack of FIG. 1. FIG. 3 is an exploded perspective view illustrating the battery pack in an exploded state. FIG. 4 is a perspective view illustrating a state in which the protective cover is detached from the stacked body illustrated in FIG. 3, and the stacked body is disassembled into a cell group and a bus bar unit. FIG. 5 is an exploded perspective view illustrating the bus bar unit illustrated in FIG. 4

Figure 6:
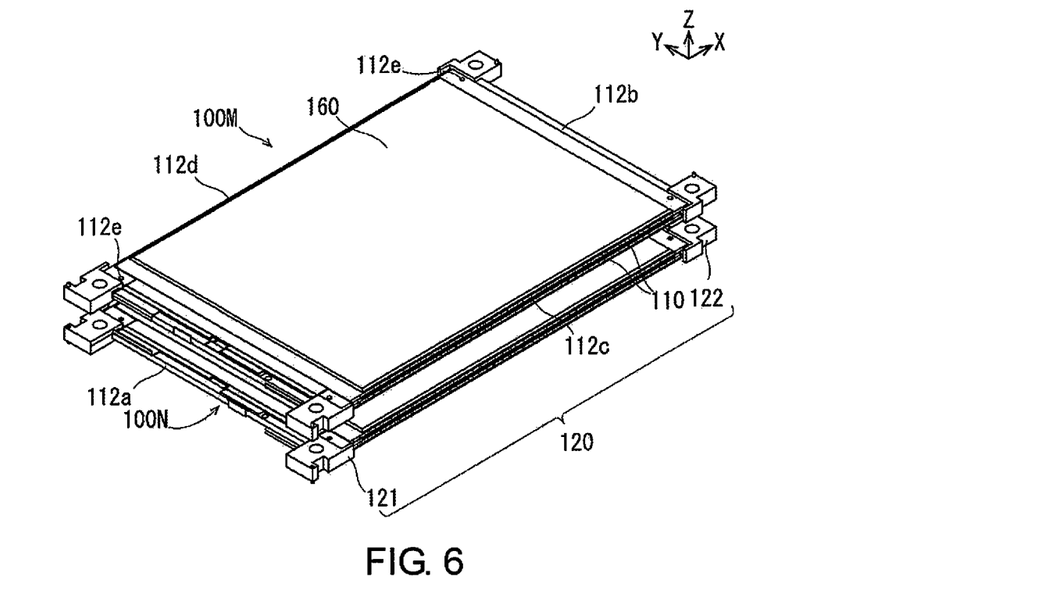
FIG. 6 is a perspective view illustrating a state in which different types of battery assemblies are disposed separated from each other in the stacking direction.
Figure 7:
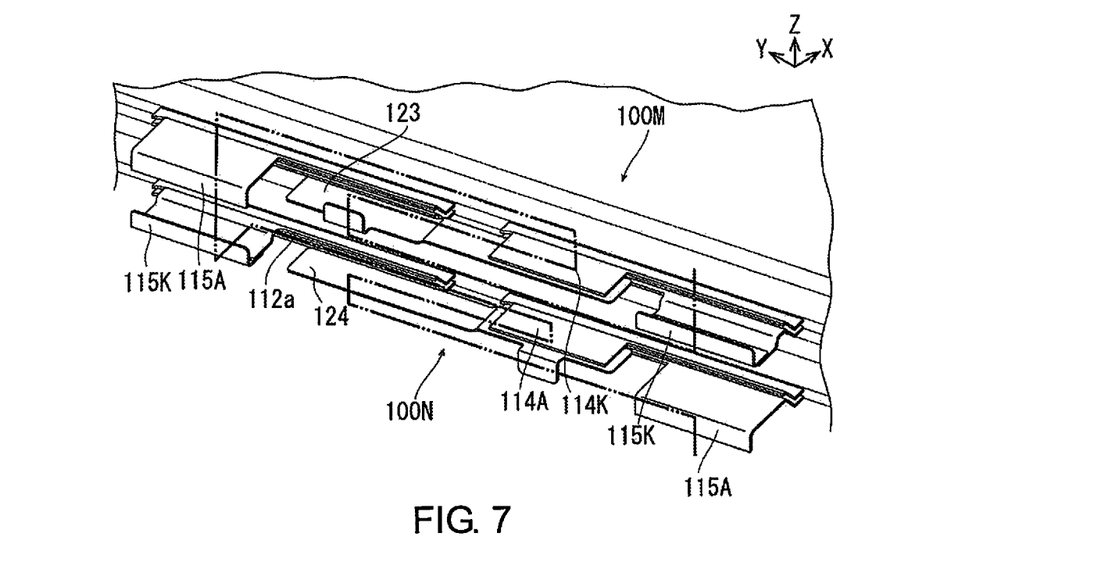
FIG. 7 is a perspective view in which the electrode tab portion of the battery assembly of FIG. 6 is enlarged, illustrating a state in which the spacer is not displayed.
Figure 8:
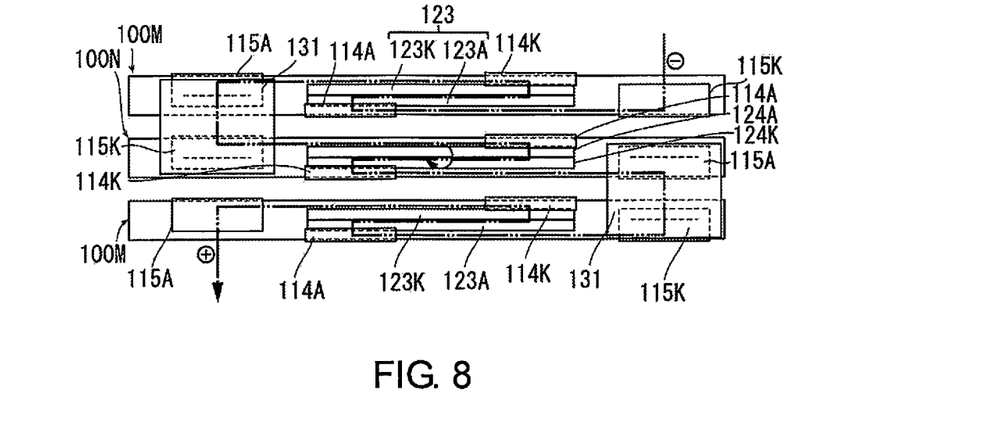
FIG. 8 is a view describing the flow of electrical current of adjacent battery assemblies.
Figure 9:
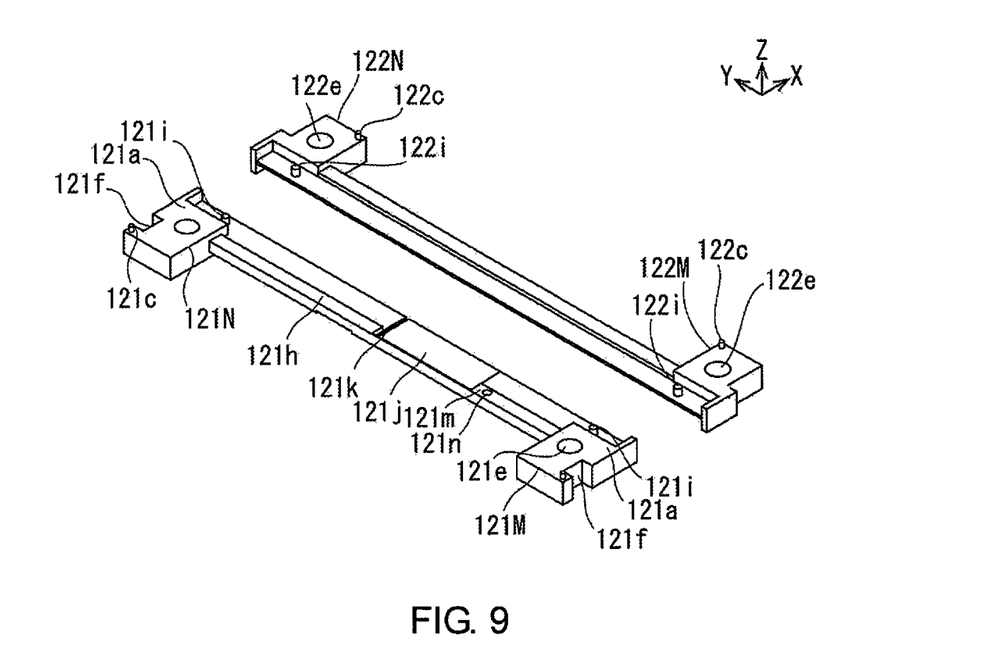
FIG. 9 is a perspective view illustrating a pair of spacers (first spacer and second spacer), which configure the battery assembly.
Figure 10A:
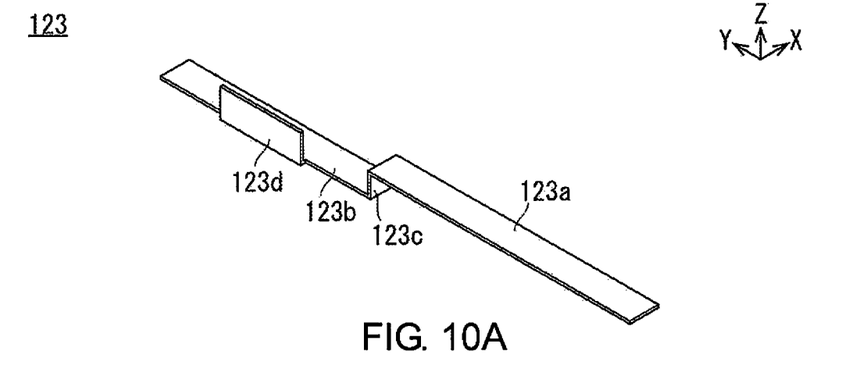
FIG. 10A and FIG. 10B are a perspective view and a front view illustrating an intra-assembly bus bar, which configures the battery assembly.
Figure 10B:
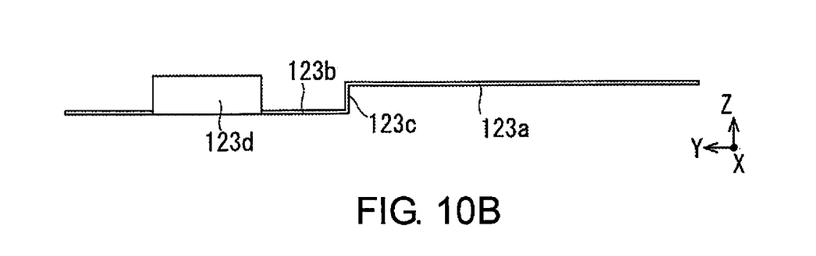
Figure 11:
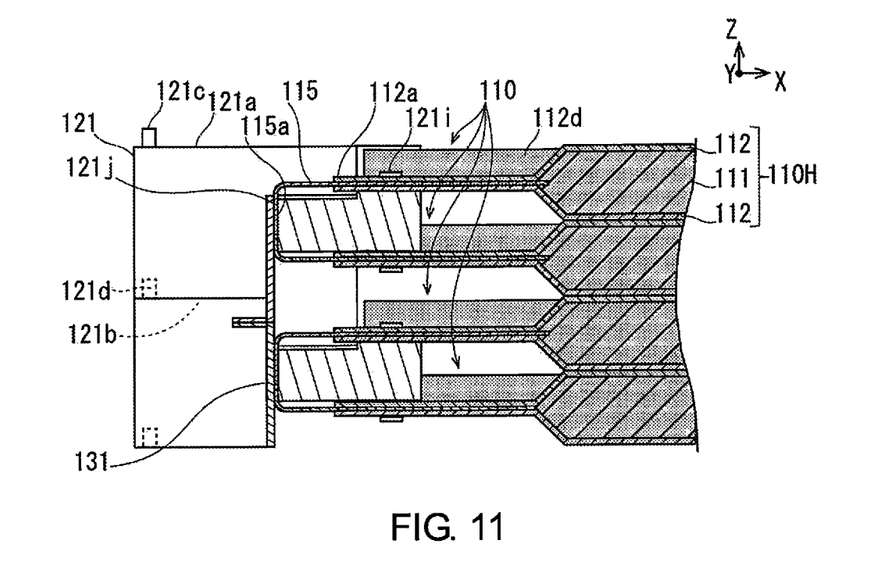
FIG. 11 is a cross-sectional view illustrating the principal part of a state in which an inter-assembly bus bar is joined to an inter-assembly electrode tab of the stacked battery assemblies.

FIG. 6 is a perspective view illustrating a state in which different types of battery assemblies are disposed separated from each other in the stacking direction. FIG. 7 is a perspective view in which the electrode tab portion of the battery assembly of FIG. 6 is enlarged, illustrating a state in which the spacer is not displayed. FIG. 8 is a view describing the flow of electrical current of adjacent battery assemblies. FIG. 9 is a perspective view illustrating a pair of spacers (first spacer and second spacer), which configure the battery assembly. FIG. 10A and FIG. 10B are a perspective view and a front view illustrating an intra-assembly bus bar, which configures the battery assembly. FIG. 11 is a cross-sectional view illustrating the principal part of a state in which an inter-assembly bus bar is joined to an inter-assembly electrode tab of the stacked battery assemblies.

In the state illustrated in FIG. 1, the left front side is referred to as the "front side" of the entire battery pack 100 and of each component part, the right rear side is referred to as the "rear side" of the entire battery pack 100 and of each component part, and the right front side and the left rear side are referred to as the left and right "lateral sides" of the entire battery pack 100 and of each component part.

The battery pack 100 comprises a stacked body 100S including a cell group 100G formed by stacking a plurality of unit cells 110 having a flat shape in the thickness direction, as illustrated in FIGS. 1 to 3. The battery pack 100 further comprises a protective cover 140 attached on the front side of the stacked body 100S, and a chassis 150 that houses the stacked body 100S in a state in which each unit cell 110 is pressurized along the stacking direction of the unit cells 110. The stacked body 100S comprises the cell group 100G, and a bus bar unit 130 attached to the front side of the cell group 100G and that integrally holds a plurality of bus bars 131, as illustrated in FIG. 4. The protective cover 140 covers and protects the bus bar unit 130. The bus bar unit 130 comprises a plurality of the bus bars 131, and a bus bar holder 132 that integrally attaches the plurality of the bus bars 131 in a matrix, as illustrated in FIG. 5. Of the plurality of the bus bars 131, an anode side terminal 133 is attached to the terminal end on the anode side, and a cathode side terminal 134 is attached to the terminal end on the cathode side.

With reference to FIG. 1 and FIG. 11, the battery pack 100 according to the present embodiment is formed by stacking a plurality of battery assemblies 100M, 100N that are each provided with a pair of the unit cells 110 that are stacked in the thickness direction and that have a cell body 110H, which includes a power generation element 111 and is formed into a flat shape, and an electrode tab protruding out from the cell body 110H, with a first spacer 121 and a second spacer 122 disposed between the electrode tabs of the pair of the stacked unit cells 110; and the first spacer 121 and the second spacer 122 hold the electrode tabs of the pair of the unit cells 110, the pair of held unit cells 110 are electrically connected to each other in the battery assemblies 100M, 100N, the distal end portions 115a of a pair of inter-assembly electrode tabs 115 that electrically connect the adjacent ones of the battery assemblies 100M, 100N to each other are bent in the stacking direction Z of the battery assemblies 100M, 100N, on a side of a surface, from among the surfaces of the first spacer 121 positioned on the opposite side of the cell body 110H, and the bent portions are electrically connected to each other. The details are described below.

The cell group 100G is configured by connecting, in series, a battery assembly 100M comprising two of the unit cells 110 electrically connected in series, and a battery assembly 100N comprising two different ones of the unit cells 110 electrically connected in series, by using an inter-assembly bus bar 131, as illustrated in FIG. 7 and FIG. 8.

The battery assembly 100M and the battery assembly 100N have the same configuration, excluding the bending directions of the distal end portions 115a of the inter-assembly electrode tabs 115, which configure the electrode tabs of the unit cells 110. Specifically, the battery assembly 100N is one in which the top and bottom of the unit cells 110 included in the battery assembly 100M are reversed. However, the bending direction of the distal end portion of the inter-assembly electrode tab 115 of the battery assembly 100N is configured to be different even if the top and bottom are reversed. A pair of the spacers 120 (the first spacer 121 and the second spacer 122) are attached to each of the unit cells 110, as illustrated in FIG. 6.

The unit cell 110 corresponds to, for example, a flat lithium ion secondary battery. The unit cell 110 comprises the cell body 110H that is obtained by sealing a power generation element 111 having a pair of laminate films 112 and a thin plate shaped electrode tab that is electrically connected to the power generation element 111 and protruding out from the cell body 110H to the outside, as illustrated in FIG. 11 and the like.

The power generation element 111 is formed by stacking a plurality of layers in which a positive electrode and a negative electrode are sandwiched by separators. The power generation element 111 is charged by receiving a supply of electric power from the outside, then it supplies electric power to an external electrical device while discharging.

The laminate film 112 is configured by covering both sides of a metal foil with a sheet having an insulating property. The pair of the laminate films 112 cover the power generation element 111 from both sides along the stacking direction Z to seal the four sides thereof. In the pair of the laminate films 112, an inter-assembly electrode tab 115A or an inter-assembly electrode tab 115K protrudes out from between end portions 112a along the short side direction Y to the outside, as illustrated in FIG. 6 and FIG. 7.

In the laminate film 112, a pair of connecting pins 121i of the first spacer 121 are respectively inserted into a pair of connecting holes 112e respectively provided on both ends of the end portion 112a along the short side direction Y, as illustrated in FIG. 6 and FIG. 9. On the other hand, in the laminate film 112, a pair of the connecting pins 122i are respectively inserted into a pair of the connecting holes 112e respectively provided on both ends of the other end portion 112b along the short side direction Y. In the laminate film 112, two end portions 112c and 112d along the longitudinal direction X are formed bent upward in the stacking direction Z.

The electrode tab is provided on each of the battery assemblies 100M, 100N. In the present embodiment, the battery assembly 100M electrically connects a pair of the unit cells 110 adjacent to each other in the stacking direction Z via an intra-assembly bus bar 123 (corresponding to a conductive member), which is a member having conductivity. The battery assembly 100N electrically connects a pair of the unit cells 110 adjacent to each other in the stacking direction Z via an intra-assembly bus bar 124.

The electrode tab includes an intra-assembly electrode tab 114 for electrically connecting a pair of adjacent unit cells 110 in the battery assemblies 100M, 100N, and an inter-assembly electrode tab 115 for electrically connecting a battery assembly 100M and a battery assembly 100N that are adjacent to each other. In the following description, 114A represents an anode electrode tab in the assembly, and 114K represents a cathode electrode tab in the assembly. In addition, 115A represents an anode electrode tab between assemblies, and 115K represents a cathode electrode tab between assemblies.

The intra-assembly electrode tab 114 is disposed on one end portion 112a on a side along the longitudinal direction X of the laminate film 112, and in a central position inward of the inter-assembly electrode tab 115 in the short side direction Y together with the intra-assembly bus bar 123, to be described later, as illustrated in FIG. 8, and the like. In other words, the intra-assembly electrode tab 114 is disposed substantially in the center of one side of the first spacer 121. In the intra-assembly electrode tab 114, an intra-assembly electrode tab 114K is provided on a unit cell 110 positioned in the upper portion of FIG. 7, and an intra-assembly electrode tab 114A (not shown) is provided on a unit cell 110 on the lower side, in the battery assembly 100M. The intra-assembly electrode tab 114K is provided on the right side in FIG. 7, and the intra-assembly electrode tab 114A is provided on the left side in FIG. 7. The intra-assembly electrode tab 114A and the intra-assembly electrode tab 114K are arranged so as to be shifted in the short side direction Y where the electrode tabs are arranged. The intra-assembly electrode tab 114A and the intra-assembly electrode tab 114K are formed extending in the longitudinal direction X. The intra-assembly electrode tab 114 is connected to an intra-assembly bus bar 123, to be described later.

The inter-assembly electrode tab 115 is disposed on an end portion side outward of the intra-assembly electrode tab 114 in the short side direction Y where the electrode tabs are arranged. In the battery assembly 100M of the present embodiment, the inter-assembly electrode tab 115A is disposed on the left side of the upper unit cell 110 in FIG. 7. In the unit cell 110 disposed on the lower side in FIG. 7, the inter-assembly electrode tab 115K is disposed on the right side.

The inter-assembly electrode tab 115 is joined to the inter-assembly bus bar 131 on the side where the inter-assembly electrode tab 115 is positioned in adjacent battery assemblies 100M, 100N, as illustrated in FIG. 8.

The inter-assembly electrode tab 115A is formed in a so-called L shape, by being extended from the cell body 110H in the longitudinal direction X and the distal end portion 115a thereof being bent in the middle and downward in the stacking direction Z. The inter-assembly electrode tab 115K is formed in an L shape by being extended from the cell body 110H in the longitudinal direction X in the same manner as the inter-assembly electrode tab 115A and being bent upward in the middle. However, the bending direction of the inter-assembly electrode tab 115 is not limited to the above, and the shape is not limited to an L shape, as long as it is possible to electrically connect the battery assemblies 100M, 100N. In addition, the distal end portion 115a is positioned on a surface, from among the surfaces of the first spacer 121 or the second spacer 122, on the opposite side of the cell body 110H.

Here, the electrical current path in the battery assembly described above will be described with reference to FIG. 8. The chain double-dashed line in FIG. 8 indicates the flow of the electrical current. The same applies to FIG. 12 and FIG. 13. The electrical current that flows from the anode electrode tab of the battery unit, which is not shown, in the battery assembly 100M flows to the inter-assembly electrode tab 115K of the cathode of the unit cell 110 in the upper right of FIG. 8, passes through the inside of the unit cell 110, and flows to the intra-assembly electrode tab 114A. The electrical current from the intra-assembly electrode tab 114A flows to the intra-assembly electrode tab 114K of the upper unit cell 110 via the intra-assembly bus bar 123, to be described later, passes through the inside of the unit cell 110, and flows to the inter-assembly electrode tab 115A. The electrical current from the inter-assembly electrode tab 115A flows to the inter-assembly electrode tab 115K of the battery assembly 100N, which is adjacent in the stacking direction Z. Then, in the battery assembly 100N, the electrical current flows in the order of inter-assembly electrode tab 115K, intra-assembly electrode tab 114A, intra-assembly bus bar 124, intra-assembly electrode tab 114K, and inter-assembly electrode tab 115A. Since the third battery assembly 100M from the top in FIG. 8 is the same as the first battery assembly 100M, a description thereof is omitted. In the case of FIG. 8, adjacent unit cells 110 in each of the battery assemblies 100M, 100N, as well as the battery assemblies 100M and 100N, are all connected in series. Adjacent battery assemblies 100M, 100N are configured so as to adhere a double-sided tape 160 thereto, as illustrated in FIG. 6.

The first spacer 121 and the second spacer 122 that configure the spacer 120 are disposed between stacked unit cells 110 in the stacking direction Z, as illustrated in FIG. 6 and FIG. 11. The first spacer 121 and the second spacer 122 are formed of a polyhedron provided with a plurality of sides and faces. The first spacer 121 is disposed along one end portion 112a of the planar direction XY in which the flat unit cell 110 extends, as illustrated in FIG. 6. The second spacer 122 is disposed along the other end portion 112b of the planar direction XY in which the flat unit cell 110 extends, on the opposite side of the end portion 112a of the unit cell 110, as illustrated in FIG. 6. A first spacer 121 and a second spacer 122 are attached to a pair of the unit cells 110, and a plurality thereof are stacked along the stacking direction Z. The first spacer 121 and the second spacer 122 are formed of reinforced plastic, or the like, having an insulating property. The first spacer 121 and the second spacer 122 will be described below.

The first spacer 121 is configured in an elongated shape in the short side direction Y where the intra-assembly electrode tab 114 and the inter-assembly electrode tab 115 are arranged, as illustrated in FIG. 9. The first spacer 121 comprises placing portions 121M, 121N for placing first spacers 121 adjacent in the stacking direction Z, at both ends in the short side direction Y.

When the first spacer 121 is stacked in a state of being attached to a unit cell 110, the upper surfaces 121a of the placing portions 121M and 121N of one first spacer 121 and the lower surfaces 121b of the placing portions 121M and 121N of another first spacer 121 disposed above said first spacer 121 come in contact, as illustrated in FIG. 11.

In the first spacer 121, in order to relatively position the plurality of unit cells 110 to be stacked, a positioning pin 121c provided on the upper surface 121a of one first spacer 121 is fitted with a positioning hole 121d that is opened on the lower surface 121b of anothqr first spacer 121 and that corresponds to the position of the positioning pin 121c, as illustrated in FIG. 9 and FIG. 11.

In the first spacer 121, a locating hole 121e for inserting a bolt that connects a plurality of battery packs 100 to each other along the stacking direction Z is opened in each of the placing portions 121M and 121N along the stacking direction Z, as illustrated in FIG. 9.

The first spacer 121 is notched further in the center than the placing portions 121M, 121N in the longitudinal direction (short side direction Y), and one end portion 112a of the laminate film 112 is placed thereon and supported thereby. The first spacer 121 is provided with a connecting pin 121*i* for attaching the laminate film 112. A pair of the unit cells 110 that configure the battery assemblies 100M, 100N are attached to the first spacer 121 and held by the connecting pin 121*i*.

The first spacer 121 is provided with a groove portion 121*k* for attaching an intra-assembly bus bar 123 or 124, as illustrated in FIG. 9. In addition, an exposed portion 121*j* where the intra-assembly bus bar 123 or 124 is disposed and exposed is provided in the vicinity of the groove portion 121*k* in the short side direction Y. An opening 121*n* is provided on the outer side of the exposed portion 121*j* such that the intra-assembly bus bar 123 or 124 can be visually confirmed from the outside. The intra-assembly bus bar 123 or 124 is disposed in the exposed portion 121*j*, and an intra-assembly electrode tab 114 is disposed thereon. In addition, the electrode tab is formed thinner than the thickness of the unit cell. Accordingly, the exposed portion 121*j* is configured such that both surfaces of the first spacer 121 in the stacking direction Z are partially cut away so that a portion of the intra-assembly bus bar 123 or 124 is exposed, such that the intra-assembly electrode tab 114 can be placed. Other than the above, the opening 121*n* may be disposed on the inner side of the exposed portion 121*j* in the first spacer 121, as long as the intra-assembly bus bar 123, 124 can be visually confirmed via the opening 121*n*.

The intra-assembly bus bar 123 comprises a contact surface 123*a* that comes in contact with at least a portion of the intra-assembly electrode tab 114 of one unit cell 110 of the pair of the unit cells 110, a contact surface 123*b* that comes in contact with at least a portion of the intra-assembly electrode tab 114 of the other unit cell 110, a connecting portion 123*c* that connects the contact surface 123*a* and the contact surface 123*b*, and a detection unit 123*d* that detects the voltage of the unit cells, as illustrated in FIG. 10A and FIG. 10B.

The contact surface 123*a* comes in contact with the intra-assembly electrode tab 114 of the upper unit cell 110 corresponding to one of the unit cells in FIG. 7, and the like. The outer side of the position of the contact surface 123*a* that comes in contact with the intra-assembly electrode tab 114 is embedded in the first spacer 121. On the other hand, the contact surface 123*b* comes in contact with the intra-assembly electrode tab 114 of the lower unit cell 110 corresponding to the other unit cell in FIG. 7, and the like. The outer sides of the surfaces of the contact surfaces 123*a*, 123*b* that come in contact with the intra-assembly electrode tab 114 are recessed in the first spacer 121 (corresponding to recessed portions).

Since the electrode tab is thinner than the unit cell, the connecting portion 123*c* is formed extending in the thickness direction of the first spacer 121 so that, in a pair of unit cells, the contact surfaces 123*a*, 123*b* can respectively come in surface contact with the electrode tabs. The connecting portion 123*c* is disposed so as to form an angle of substantially 90 degrees with the contact surfaces 123*a*, 123*b*. However, the shape is not limited to the above as long as the contact surfaces 123*a*, 123*b* can respectively come in contact with the intra-assembly electrode tab 114. The detection unit 123*d* detects the voltage per unit cell during manufacture or use of the battery pack. Since the detection unit 123*d* is integrally provided on the intra-assembly bus bar 123 in the present embodiment, it is possible to reduce the number of parts. In addition, when unit cells are connected to each other in series in the intra-assembly electrode tab 114, the intra-assembly bus bar 123 is configured from two bus bars, an anode intra-assembly bus bar 123A and a cathode intra-assembly bus bar 123K, and the two are joined by using ultrasonic waves, or the like, as illustrated in FIG. 8.

The second spacer 122 is not provided with an intra-assembly electrode tab 114 and an inter-assembly electrode tab 115. Therefore, the second spacer 122 comprises placing portions 122M, 122N, a positioning pin 122*c*, a positioning hole, a locating hole 122*e*, and a connecting pin 122*i*, in the same manner as the first spacer 121. However, the groove portion 121*k*, the exposed portion 121*j*, and the opening 121*n* are not provided.

The bus bar unit 130 is integrally provided with a plurality of bus bars 131, as illustrated in FIG. 4 and FIG. 5. The bus bar 131 is made of a metal having electrical conductivity and electrically connects the distal end portions of the inter-assembly electrode tabs 115 of different unit cells 110 to each other. The bus bar 131 is formed in a flat plate shape and is disposed in a state of being erected along the stacking direction Z.

The bus bar 131 is integrally formed by joining an anode side bus bar 131A that is joined with the inter-assembly electrode tab 115A of the anode of one of the unit cells 110, and a cathode side bus bar 131K that is joined with an inter-assembly electrode tab 115K of the cathode of another of the unit cells 110 adjacent along the stacking direction Z, as illustrated in FIG. 5.

The anode side bus bar 131A and the cathode side bus bar 131K have the same shape and are respectively formed in an L shape, as illustrated in FIG. 5. The anode side bus bar 131A and the cathode side bus bar 131K are superimposed with the top and bottom inverted. Specifically, the bus bar 131 is integrated by joining the bent portion of one end portion of the anode side bus bar 131A along the stacking direction Z and the bent portion of the end portion of the cathode side bus bar 131K along the stacking direction Z. The anode side bus bar 131A and the cathode side bus bar 131K are provided with side portions at one end in the short side direction Y along the longitudinal direction X, as illustrated in FIG. 5. The side portions are joined to the bus bar holder 132.

The anode side bus bar 131A is made of aluminum in the same manner as the anode side electrode tab. The cathode side bus bar 131K is made of copper, in the same manner as the cathode side electrode tab. The anode side bus bar 131A and the cathode side bus bar 131K made of different metals are joined to each other by using ultrasonic joining.

In the bus bar 131, the anode side bus bar 131A or the cathode side bus bar 131K is joined to the inter-assembly electrode tab 115A of the anode and the inter-assembly electrode tab 115K of the cathode of the battery assemblies 100M, 100N by using laser welding, or the like.

However, of the bus bars 131 arranged in a matrix shape, the bus bar 131 positioned on the upper right in the drawing in FIG. 4 and FIG. 5 corresponds to the anode side terminal ends of a plurality of unit cells 110 connected in series, and is configured from only an anode side bus bar 131A. This anode side bus bar 131A is joined to the anode side electrode tab of the uppermost battery assembly 100M of the cell group 100G by using laser welding, or the like. In the same manner, of the bus bars 131 arranged in a matrix shape, the bus bar 131 positioned on the lower left in the drawing in FIG. 4 and FIG. 5 corresponds to the cathode side terminal ends of a plurality of unit cells 110, and is configured from only a cathode side bus bar 131K. This cathode side bus bar 131K is joined to the cathode side electrode tab of the lowermost battery assembly 100N of the cell group 100G by using laser welding, or the like.

The bus bar holder 132 integrally holds a plurality of bus bars 131 in a matrix so as to face the inter-assembly electrode tab 115 of each of a plurality of stacked unit cells 110, as illustrated in FIG. 4 and FIG. 5. The bus bar holder 132 is made of resin having insulating properties and is formed in a frame shape.

The bus bar holder 132 is respectively provided with a pair of columnar support portions 132a erected along the stacking direction Z, so as to be positioned on both sides of the longitudinal direction of the first spacers 121 that support the electrode tabs of the unit cells 110, as illustrated in FIG. 5. The pair of columnar support portions 132a are fitted to the side surfaces of the placing portions 121M and 121N of the first spacer 121. The pair of columnar support portions 132a have an L shape when viewed in plan view from the stacking direction Z, and are formed in a plate shape extended along the stacking direction Z. The bus bar holder 132 is provided with a pair of auxiliary columnar support portions 132b at an interval, erected along the stacking direction Z so as to be positioned in the vicinity of the center of the first spacer 121 in the longitudinal direction. The pair of auxiliary columnar support portions 132b are formed in a plate shape extended along the stacking direction Z.

The bus bar holder 132 comprises insulating portions 132c that respectively protrude between adjacent bus bars 131 along the stacking direction Z, as illustrated in FIG. 5. The insulating portions 132c are formed in a plate shape extended along the short side direction Y. Each of the insulating portions 132c is provided horizontally between the columnar support portion 132a and the auxiliary columnar support portion 132b. The insulating portion 132c prevents discharge by insulating the space between the bus bars 131 of the unit cells 110 that are adjacent to each other along the stacking direction Z.

The bus bar holder 132 may be configured by joining the columnar support portion 132a, the auxiliary columnar support portion 132b, and the insulating portion 132c, which are independently formed, or it may be configured by integrally molding the columnar support portion 132a, the auxiliary columnar support portion 132b, and the insulating portion 132c.

The anode side terminal 133 corresponds to the anode side terminal end of the cell group 100G configured by alternately stacking the first battery assembly 100M and the battery assembly 100N, as illustrated in FIG. 4 and FIG. 5.

The anode side terminal 133 is joined to the anode side bus bar 131A positioned on the upper right in the drawing, from among the bus bars 131 arranged in a matrix, as illustrated in FIG. 4 and FIG. 5. The anode side terminal 133 is made of a metal plate having electrical conductivity, and, when viewed along the short side direction Y, has a shape in which the one end portion 133a and the other end portion 133c are bent in different directions along the stacking direction Z with reference to the central portion 133b. The one end portion 133a is joined to the anode side bus bar 131A by using laser welding, or the like. An external input/output terminal is connected to a hole 133d (including the screw groove) opened in the center of the other end portion 133c.

The cathode side terminal 134 corresponds to the cathode side terminal end of the cell group 100G configured by alternately stacking the battery assembly 100M and the battery assembly 100N, as illustrated in FIG. 4 and FIG. 5. The cathode side terminal 134 is joined to the cathode side bus bar 131K positioned on the lower left in the drawing, from among the bus bars 131 arranged in a matrix, as illustrated in FIG. 4 and FIG. 5. The cathode side terminal 134 is configured in the same manner as the anode side terminal 133.

The protective cover 140 prevents the bus bars 131 from short-circuiting with each other and the bus bars 131 from coming in contact with an external member and being short-circuited or causing electric leakage by covering the bus bar unit 130, as illustrated in FIGS. 1, 3, and 4. Furthermore, the protective cover 140 exposes the anode side terminal 133 and the cathode side terminal 134 to the outside, and causes the power generation element 111 of each unit cell 110 to charge and discharge. The protective cover 140 is made of plastics having insulating properties.

The protective cover 140 is formed in a flat plate shape and is erected along the stacking direction Z, as illustrated in FIG. 4. The protective cover 140 has a shape in which the upper end 140b and the lower end 140c of the side surface 140a thereof are bent along the longitudinal direction X, and is fitted to the bus bar unit 130.

The side surface 140a of the protective cover 140 is provided with a first opening 140d formed of a rectangular hole that is slightly larger than the anode side terminal 133, in a position that corresponds to the anode side terminal 133 provided on the bus bar unit 130, as illustrated in FIG. 3 and FIG. 4. In the same manner, the side surface 140a of the protective cover 140 is provided with a second opening 140e formed of a rectangular hole that is slightly larger than the cathode side terminal 134, in a position that corresponds to the cathode side terminal 134 provided on the bus bar unit 130.

The chassis 150 houses the cell group 100G in a state of being pressurized along the stacking direction, as illustrated in FIG. 1 and FIG. 2B. An appropriate surface pressure is imparted to the power generation element 111 by sandwiching and pressurizing the power generation element 111 of each unit cell 110 provided on the cell group 100G with the upper pressure plate 151 and the lower pressure plate 152. In other words, the height of the cell group 100G in the battery pack 100 is configured to be lower than the height when the same number of unit cells 110 as that of the cell group 100G are stacked in a non-loaded state by the upper pressure plate 151 and the lower pressure plate 152.

The upper pressure plate 151 is disposed above the cell group 100G along the stacking direction Z, as illustrated in FIG. 1 and FIG. 3. The upper pressure plate 151 is provided with a pressing surface 151a protruding downward along the stacking direction Z in the center thereof. The power generation element 111 of each unit cell 110 is pressed downward by the pressing surface 151a. The upper pressure plate 151 is provided with a holding portion 151b extended along the longitudinal direction X from both sides along the short side direction Y. The holding portion 151b covers the placing portions 121M and 121N of the first spacer 121, or the placing portions 122M and 122N of the second spacer 122. A locating hole 151 c, which communicates with the positioning hole 121d of the first spacer 121 or the positioning hole of the second spacer 122 along the stacking direction Z, in the center of the holding portion 151b. A bolt that connects battery packs 100 with each other is inserted into the locating hole 151c. The upper pressure plate 151 is made of a metal plate having a sufficient thickness. In addition, the upper pressure plate 151 comprises a bent portion 151d formed by bending both ends in the short side direction Y that intersects the stacking direction Z, as a joint portion with the side plate 153, as illustrated in FIG. 3.

The lower pressure plate 152 has the same configuration as the upper pressure plate 151 and is formed by reversing the top and bottom of the upper pressure plate 151, as illustrated in FIG. 1 and FIG. 3. The lower pressure plate 152 is disposed below the cell group 100G along the stacking direction Z. The lower pressure plate 152 presses the power generation element 111 of each unit cell 110 upward with the pressing surface 152*a* protruding upward along the stacking direction Z. In addition, the lower pressure plate 152 comprises a bent portion 152*d* formed by bending both ends in the short side direction Y that intersects the stacking direction Z, as a joint portion with the side plate 153, as illustrated in FIG. 3.

One pair of side plates 153 fix the relative positions of the upper pressure plate 151 and the lower pressure plate 152 such that the upper pressure plate 151 and the lower pressure plate 152, which sandwich and press the cell group 100G from above and below in the stacking direction Z, are not separated from each other, as illustrated in FIG. 1 and FIG. 3. The side plate 153 is made of a rectangular metal plate, and is erected along the stacking direction Z. One pair of side plates 153 are joined to the upper pressure plate 151 and the lower pressure plate 152 from both sides in the short side direction Y of the cell group 100G by using laser welding. In each of the side plates 153, a linear welding portion 153*c* is formed by using seam welding, or the like, at the upper end 153*a* portion that abuts the upper pressure plate 151 along the longitudinal direction X, as illustrated in FIG. 2B. In the same manner, in each of the side plates 153, a linear welding portion 153*d* is formed by using seam welding, or the like, at the lower end 153*b* portion that abuts the lower pressure plate 152 along the longitudinal direction X. The pair of side plates 153 cover and protect both sides of the cell group 100G in the short side direction Y.

In accordance with the battery pack 100 according to the embodiment described above, the following actions and effects can be achieved. In the present invention, the first spacer 121 and the second spacer 122 hold the electrode tabs of the pair of the unit cells 110, the pair of held unit cells 110 are electrically connected to each other in the battery assemblies 100M, 100N, the distal end portions 115*a* of a pair of inter-assembly electrode tabs 115 that electrically connect the adjacent ones of the battery assemblies 100M, 100N to each other are bent in the stacking direction Z of the battery assemblies 100M, 100N on a side of a surface, from among the surfaces of the first spacer 121, positioned on the opposite side of the cell body 110H, and the bent portions are electrically connected to each other. Accordingly, it is possible to configure the spacer to be relatively thick even if the unit cells are configured to be thin for the purpose of reducing the volume of the battery pack, and to improve the moldability and strength of the spacer. In addition, since the distal end portion 115*a* of the inter-assembly electrode tab 115 is bent, it is possible to reduce the area when viewing the battery pack in plan view, and to reduce the size thereof.

Additionally, the pair of the unit cells 110 that configure the battery assemblies 100M, 100N are electrically connected via the intra-assembly bus bar 123, which is a conductive member, the inter-assembly electrode tabs 115 that electrically connect adjacent battery assemblies 100M, 100N to each other are disposed on both ends of the first spacer 121 in the short side direction Y, and the position where a pair of the unit cells 110 are electrically connected to each other by using the intra-assembly bus bar 123 is in a central position on the inner side of the position where the adjacent ones of the battery assemblies 100M, 100N are electrically connected to each other. Accordingly, it is possible to make the electrical current path relatively short, compared to a case in which the intra-assembly electrode tab is disposed on the outer side of the inter-assembly electrode tab, in the battery assembly 100M and the battery assembly 100N.

In addition, the intra-assembly bus bar 123 or 124 is attached to the first spacer 121 in the battery assemblies 100M, 100N. Accordingly, it is possible to reduce the number of parts, and to improve the assembling workability, compared to a case in which the intra-assembly bus bar 123 or 124 is assembled separately from the first spacer 121.

Additionally, the intra-assembly bus bar 123 comprises a voltage detector 123*d* used when detecting the voltage, which is configured to be integrally provided. Accordingly, it is possible to reduce the number of parts, compared to a case in which a voltage detector is provided as a separate part.

In addition, the first spacer 121 is configured to comprise an opening 121*n* for visually confirming the portion where the intra-assembly bus bar 123 attached to the groove portion 121*k* is recessed in the first spacer 121 at the contact surface 123*a* from the outside. Accordingly, it is possible to visually confirm the intra-assembly bus bar 123 or 124 reliably, when assembling and shipping the battery assemblies 100M, 100N, or when assembling a battery pack 100 using the battery assemblies 100M, 100N. Therefore, it is possible to reliably detect a misassembly at the time of the assembly described above, or the like.

Figure 12:
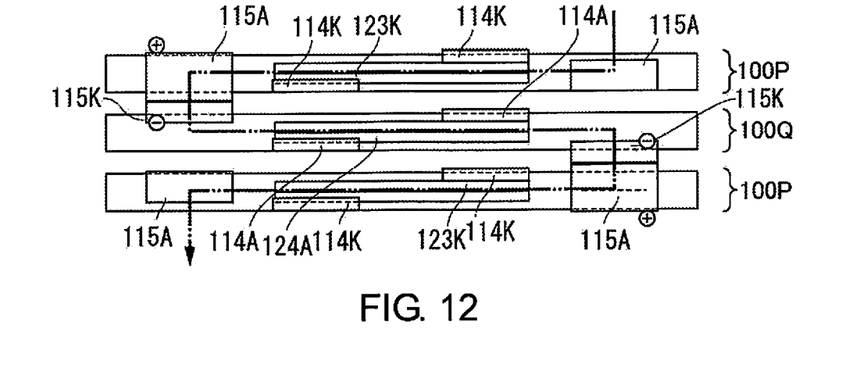
FIG. 12 is a view of a modified example of the intra-assembly electrode tab and the inter-assembly electrode tab, describing the flow of electrical current.
Figure 13:
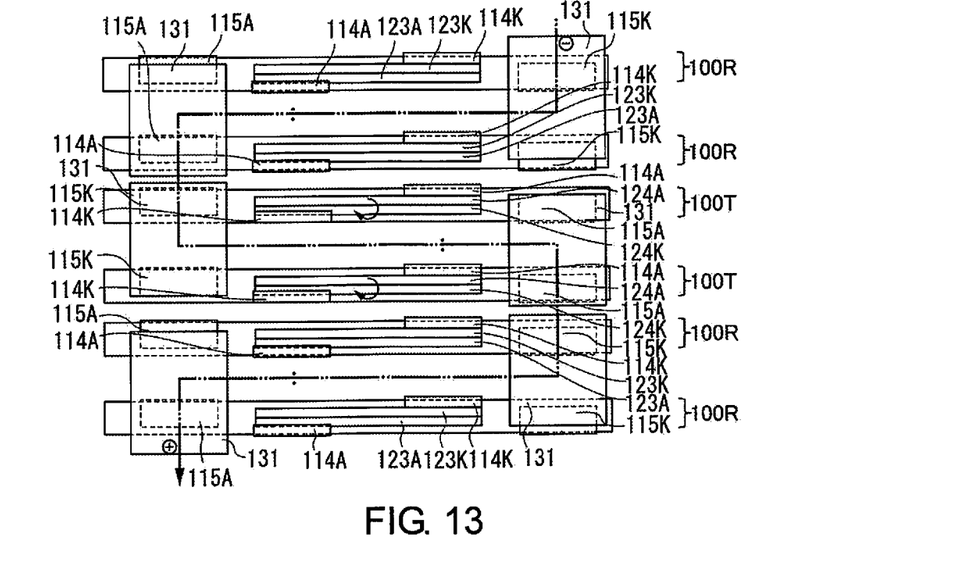
FIG. 13 is a view of a modified example of the intra-assembly electrode tab and the inter-assembly electrode tab, describing the flow of electrical current.

The present invention is not limited to the embodiment described above, and various modifications are possible within the scope of the claims. FIG. 12 and FIG. 13 are views of modified examples of the intra-assembly electrode tab and the inter-assembly electrode tab, describing the flow of electrical current.

An embodiment was described above in which a pair of the unit cells 110 in the battery assemblies 100M, 100N are connected in series using the intra-assembly bus bars 123, 124, and the battery assemblies 100M, 100N are connected in series using the bus bar 131.

However, the present invention is not limited thereto; the battery assemblies 100M, 100N may be configured such that the battery assemblies 100M, 100N are electrically connected by directly contacting and joining the inter-assembly electrode tab 115 without using a bus bar 131. If the polarities of inter-assembly electrode tabs 115 that are adjacent between the battery assemblies 100M, 100N are changed, and the polarities of the intra-assembly electrode tabs 114 are made different in adjacent ones of the battery assemblies 100M, 100N, all of the unit cells constituting the battery assembly will be connected in series.

In addition, it is possible to make the polarities of the intra-assembly electrode tabs 114 the same in the pair of the unit cells 110 that constitute the battery assembly 100M or 100N, and to make the polarities of the inter-assembly electrode tabs 115 between the battery assemblies 100M, 100N different, as illustrated in FIG. 12. By configuring in this manner, it is possible to connect the unit cells in parallel within the battery module and to connect the unit cells in series between battery modules. When connecting in parallel within the battery assembly as described above, the number of intra-assembly bus bars may be one, unlike in the above-described embodiment. In addition, in FIG. 12, adjacent inter-assembly electrode tabs 115 of the battery assembly are directly joined on the side where the inter-assembly electrode tabs 115 are positioned without using the inter-assembly bus bar 131. However, the present invention is not limited thereto, and the inter-assembly bus bar 131 may be use in the same manner as described above.

Additionally, the first and second battery assemblies 100R from the top are connected in parallel, the third and fourth battery assemblies 100T are connected in parallel, and the fifth and sixth battery assemblies 100R are connected in parallel, as illustrated in FIG. 13. The second battery assembly 100R and the third battery assembly 100T, and the fourth battery assembly 100T and the fifth battery assembly 100R, are connected in series. Furthermore, each of the pair of the unit cells 110 that constitute the first to the sixth battery assemblies may be connected in series. In this manner, by connecting adjacent battery assemblies in series or in parallel, and connecting the unit cells within the battery assembly to each other in series or in parallel, it is possible to change the combination of series connection and parallel connection to realize a battery pack corresponding to the desired voltage and current characteristics.

An embodiment was described above in which the intra-assembly electrode tab 114 and the inter-assembly electrode tab 115 are disposed at one end portion 112a of the laminate film 112. In addition to the above, an intra-assembly electrode tab and an inter-assembly electrode tab can be disposed at one end portion 112a and the other end portion 112b of the laminate film 112.

Figure 14:
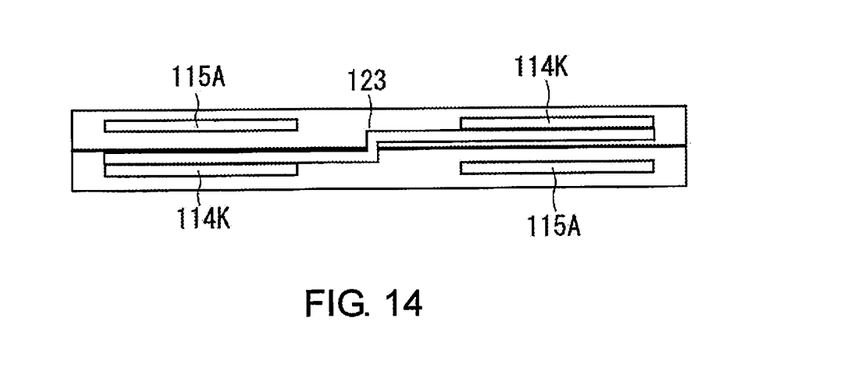
FIG. 14 is a view illustrating a modified example relating to the positional relationship between the intra-assembly electrode tab and the inter-assembly electrode tab.

FIG. 14 is a view illustrating a modified example relating to the positional relationship between the intra-assembly electrode tab and the inter-assembly electrode tab. An embodiment was described above in which the intra-assembly electrode tab 114 is disposed inward of the inter-assembly electrode tab 115. In such a case, there is the advantage that it is easy to insulate the intra-assembly electrode tab 114 from the inter-assembly electrode tab 115.

However, the present invention is not limited to the above; the intra-assembly electrode tab 114 and the inter-assembly electrode tab 115 may have different positions in the stacking direction Z corresponding to the height (thickness) direction and be arranged so as to overlap in the short side direction Y where the electrode tabs are arranged. By configuring in this manner, it is possible to make the length of each electrode tab in the short side direction Y relatively large, which facilitates handling of specifications in which a relatively high output is required.

The invention claimed is:

1. A battery pack comprising:
a plurality of stacked battery assemblies that are each provided with at least a pair of unit cells stacked in a thickness direction, each of the unit cells each including
a cell body having a flat shape and comprising a power generation element covered by a laminate film, and
an electrode tab protruding out from the cell body; and
an insulating spacer disposed between electrode tabs of the pair of the unit cells holding the electrode tabs and being electrically connected in the battery assemblies,
a pair of the electrode tabs having distal end portions electrically connecting adjacent battery assemblies of the battery assemblies to each other, the distal end portions being bent in a stacking direction and in direct contact with a side of a surface of the insulating spacer, the distal end portions being positioned on opposite sides of the cell body, and the distal end portions that are bent being electrically connected to each other, and
the insulating spacer being disposed between the pair of the unit cells and the insulating spacer supporting both the electrode tabs of the pair of the unit cells and ends of the laminate films of the pair of the unit cells.

2. The battery pack according to claim 1, wherein
the pair of the unit cells are electrically connected by a conductive member having conductivity,
the pair of the electrode tabs electrically connecting the adjacent battery assemblies are disposed on both ends of the insulating spacer, and
the pair of the unit cells that are electrically connected to each other by the conductive member is on an inner side of a position where the adjacent battery assemblies are electrically connected to each other.

3. The battery pack according to claim 2, wherein
the conductive member includes a bus bar held by the insulating spacer,
the insulating spacer has a plurality of sides and holds the bus bar at a center of one side of the plurality of sides, and the bus bar electrically connects the adjacent battery assemblies to each other at an end portion of the one side.

4. The battery pack according to claim 2, wherein
the pair of the unit cells are connected in parallel by the conductive member.

5. The battery pack according to claim 2, wherein
the conductive member includes a bus bar, and
the insulating spacer is attached to the bus bar.

6. The battery pack according to claim 3, further comprising
a voltage detector for detecting voltage, the voltage detector being integrally provided on the bus bar.

7. The battery pack according to claim 2, wherein
the conductive member includes a recessed portion that is inserted into a groove portion provided on the insulating spacer and at least a portion of the conductive member attached to the groove portion is recessed in the insulating spacer, and
the insulating spacer further includes an opening for visually confirming insertion of the recessed portion into the groove portion from outside of the battery pack.

8. The battery pack according to claim 1, wherein
the adjacent battery assemblies are electrically connected to the pair of the electrode tabs by at least one of directly joining and joining via a bus bar.

9. A battery pack comprising:
a plurality of stacked battery assemblies that are each provided with at least a pair of unit cells stacked in a thickness direction, each of the unit cells each including
a cell body having a flat shape and comprising a power generation element covered by a laminate film, and
an electrode tab protruding out from the cell body; and
an insulating spacer disposed between electrode tabs of the pair of the unit cells holding the electrode tabs and being electrically connected in the battery assemblies,
a pair of the electrode tabs having distal end portions electrically connecting adjacent battery assemblies of the battery assemblies to each other, the distal end portions being bent in a stacking direction and in direct contact with a side of a surface of the insulating spacer, the distal end portions being positioned on opposite sides of the cell body, and the distal end portions that are bent being electrically connected to each other,
the insulating spacer being disposed between the pair of the unit cells and the insulating spacer supporting both the electrode tabs of the pair of the unit cells and ends of the laminate films of the pair of the unit cells, and
one of the distal end portions that are bent being disposed between the surface of the insulating spacer and a bus bar that electrically connects the adjacent battery assemblies, and the bus bar being laser-welded to the one of the distal end portions that are bent.

\* \* \* \* \*